United States Patent
Halupka et al.

(10) Patent No.: US 11,024,013 B2
(45) Date of Patent: Jun. 1, 2021

(54) NEURAL NETWORK BASED ENHANCEMENT OF INTENSITY IMAGES

(71) Applicants: International Business Machines Corporation, Armonk, NY (US); New York University, New York, NY (US)

(72) Inventors: Kerry Halupka, Northcote (AU); Bhavna Josephine Antony, Brunswick East (AU); Suman Sedai, Hughesdale (AU); Rahil Garnavi, Macleod (AU); Hiroshi Ishikawa, Shizuoka (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 172 days.

(21) Appl. No.: 16/296,656

(22) Filed: Mar. 8, 2019

(65) Prior Publication Data

US 2020/0286208 A1    Sep. 10, 2020

(51) Int. Cl.
*G06T 5/00* (2006.01)
*G06T 5/50* (2006.01)
(Continued)

(52) U.S. Cl.
CPC .......... *G06T 5/002* (2013.01); *G06N 3/0454* (2013.01); *G06N 3/088* (2013.01); *G06T 5/50* (2013.01);
(Continued)

(58) Field of Classification Search
None
See application file for complete search history.

(56) References Cited

U.S. PATENT DOCUMENTS 8,885,901 B1    11/2014  Solanki et al.
9,600,911 B2     3/2017  Wang et al.
(Continued)

FOREIGN PATENT DOCUMENTS

CN    108492258 A  *  9/2018
FR    2693397 A1       9/1992
WO    2016080914 A1    5/2016

OTHER PUBLICATIONS

Xu et al., "Improving the Resolution of Retinal OCT with Deep Learning", MIUA 2018. https://miua2018.soton.ac.uk/documents/papers/MIUA2018_046.pdf.
(Continued)

*Primary Examiner* — Justin P. Misleh
(74) *Attorney, Agent, or Firm* — Garg Law Firm, PLLC; Rakesh Garg; Joseph Petrokaitis

(57) ABSTRACT

A generative adversarial network including a generator portion and a discriminator portion is constructed. The network is configured such that the network operates to enhance intensity images, wherein an intensity image is obtained by illuminating an object with an energy pulse and measuring the return strength of the energy pulse, and wherein a pixel of the intensity image corresponds to the return strength. As a part of the configuring, a loss function of the generative adversarial network is minimized, the loss function comprising a mean square error loss measurement of a noisy intensity image relative to a mean square error loss measurement of a corresponding clean intensity image. An enhanced intensity image is generated by applying the minimized loss function of the network to an original intensity image, the applying improving an image quality measurement of the enhanced intensity image relative to the original intensity image.

20 Claims, 10 Drawing Sheets

(51) Int. Cl.
*G06N 3/08* (2006.01)
*G06N 3/04* (2006.01)

(52) U.S. Cl.
CPC .............. *G06T 2207/20081* (2013.01); *G06T 2207/20084* (2013.01); *G06T 2207/20212* (2013.01); *G06T 2207/30168* (2013.01)

(56) References Cited

U.S. PATENT DOCUMENTS

| | | |
|---|---|---|
| 9,700,206 B2 | 7/2017 | An et al. |
| 9,704,035 B2 | 7/2017 | Wiswen et al. |
| 9,990,558 B2 | 6/2018 | Lin et al. |
| 2011/0267340 A1 | 11/2011 | Kraus et al. |
| 2015/0233701 A1 | 8/2015 | Hogan |
| 2017/0140560 A1 | 5/2017 | Kraus et al. |
| 2017/0319059 A1 | 11/2017 | Cheng et al. |
| 2018/0042473 A1 | 2/2018 | Wang et al. |
| 2018/0075581 A1* | 3/2018 | Shi ................... G06N 3/0472 |
| 2019/0333219 A1* | 10/2019 | Xu ..................... G06T 7/0014 |
| 2020/0202502 A1* | 6/2020 | Tsymbalenko ............ G06T 5/50 |
| 2020/0294201 A1* | 9/2020 | Planche .................. G06K 9/40 |
| 2020/0349449 A1* | 11/2020 | Wang ..................... G06T 11/00 |

OTHER PUBLICATIONS

Kerry J. Halupka et al., Retinal Optical Coherence Tomography Image Enhancement Via Deep Learning, Nov. 13, 2018.

\* cited by examiner

NEURAL NETWORK BASED ENHANCEMENT OF INTENSITY IMAGES

TECHNICAL FIELD

The present invention relates generally to a method, system, and computer program product for image enhancement. More particularly, the present invention relates to a method, system, and computer program product for neural network based enhancement of intensity images.

BACKGROUND

Intensity images are images formed using intensity data. When a point on an object is struck by a pulse of energy, intensity data is a measurement of the return strength of that pulse of energy. Intensity data is also referred to as return pulse amplitude and backscattered intensity of reflection. A two-dimensional intensity image is typically assembled using a raster method, by scanning an object, using a series of pulses or a beam of energy, along a series of parallel lines and measuring the resulting intensity data. The resulting intensity data is then mapped to an intensity image. In the resulting intensity image, data from each scan line is typically depicted as an image row or column. Data from adjacent scan lines forms a single two-dimensional intensity image. The value of the intensity data for a particular point on the object is mapped to a value for a corresponding pixel at corresponding row and column coordinates in the resulting image. For example, if the intensity image is a grey-scale image, the low end of the intensity data range is depicted with 0 percent brightness (i.e. black). The high end of the intensity data range is depicted with 100 percent brightness (i.e. white).

Intensity images are an important class of image data. For example, optical coherence tomography (OCT) is an imaging technique that uses low-coherence light to capture micrometer-resolution, two- and three-dimensional sub-surface images of translucent or opaque materials (e.g. biological tissue), without sample preparation or ionizing radiation. In OCT, light is reflected onto the subject matter being studied and an image formed using the intensity of the light reflected back.

OCT is used in non-biological applications, for example, art conservation and other non-destructive testing applications. OCT is also commonly used to obtain images of the retina portion of an eye. Covering the inside of most of the eye, the retina is a multilayered structure responsible for transforming light energy into neural signals for further use by the brain. Conventional OCT imaging devices scan a light beam transversally across a target object, in one or two dimensions perpendicular to the direction of propagation of the light beam.

A one-dimensional signal recorded along the direction of the light beam is called an A-scan. Multiple A-scans, composed along a line substantially perpendicular the light beam, form a two-dimensional cross-sectional image of the target object. This two-dimensional cross-sectional image is called a B-scan. In a B-scan of a retina, for example, subtle differences in retinal structure are shown by different pixel brightness levels caused by differences in the light levels reflected back to a light sensor. The images can be used in diagnosis and management of eye diseases such as glaucoma and macular degeneration.

As another example, medical ultrasound (also known as sonography) is a diagnostic imaging technique based on the application of ultrasound. Similar to OCT, in sonography a pulse of sound is reflected onto the subject matter being studied and an image formed based on the sound reflected back. For example, a B-mode or brightness image displays the acoustic impedance of a two-dimensional cross-section of tissue. Other types of medical ultrasound imaging can display blood flow, motion of tissue over time, the location of blood, the presence of specific molecules, the stiffness of tissue, or the anatomy of a three-dimensional region.

Lidar images are also intensity images. Lidar is a surveying method that measures distance to a target by illuminating the target with pulsed laser light and measuring the reflected pulses with a sensor. Depending on the target, lidar uses ultraviolet, visible, or near infrared light to image objects.

Radar can also be used to create intensity images. Similar to lidar, radar uses electromagnetic pulses or continuous waves, in radio or microwave wavelengths, to scan objects and measure the intensity data reflected back to a sensor.

Intensity images are obtained in an active manner, by illuminating an object with an energy pulse and measuring the return strength of that pulse of energy. In contrast, conventional photography, and techniques similar to conventional photography using energy in wavelengths other than human-visible light, does not require active illumination of an object. Instead, conventional photography uses passive sensors that measure reflected or emitted radiation from an object being observed. For example, a conventional optical camera captures light reflected off an object and onto a photographic film or an array of digital light sensors. However, passive methods require a separate source of energy. For example, optical photography requires sunlight when outdoors. As a result, passive methods are often not effective the source of energy is lacking (e.g. at night for optical photography) or another structure that blocks or attenuates a particular range of wavelengths occludes the target object. As used herein, the term intensity image excludes an image obtained in a passive manner, without illuminating an object with an energy pulse and measuring the return strength of that pulse of energy.

SUMMARY

The illustrative embodiments provide a method, system, and computer program product. An embodiment includes a method that constructs a generative adversarial network (network) comprising a generator portion and a discriminator portion. An embodiment configures the network such that the network operates to enhance intensity images, wherein an intensity image is obtained by illuminating an object with an energy pulse and measuring the return strength of the energy pulse, and wherein a pixel of the intensity image corresponds to the return strength. An embodiment minimizes, as a part of the configuring, a loss function of the generative adversarial network, the loss function comprising a mean square error loss measurement of a noisy intensity image relative to a mean square error loss measurement of a corresponding clean intensity image. An embodiment generates an enhanced intensity image by applying the minimized loss function of the network to an original intensity image, the applying improving an image quality measurement of the enhanced intensity image relative to the original intensity image.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
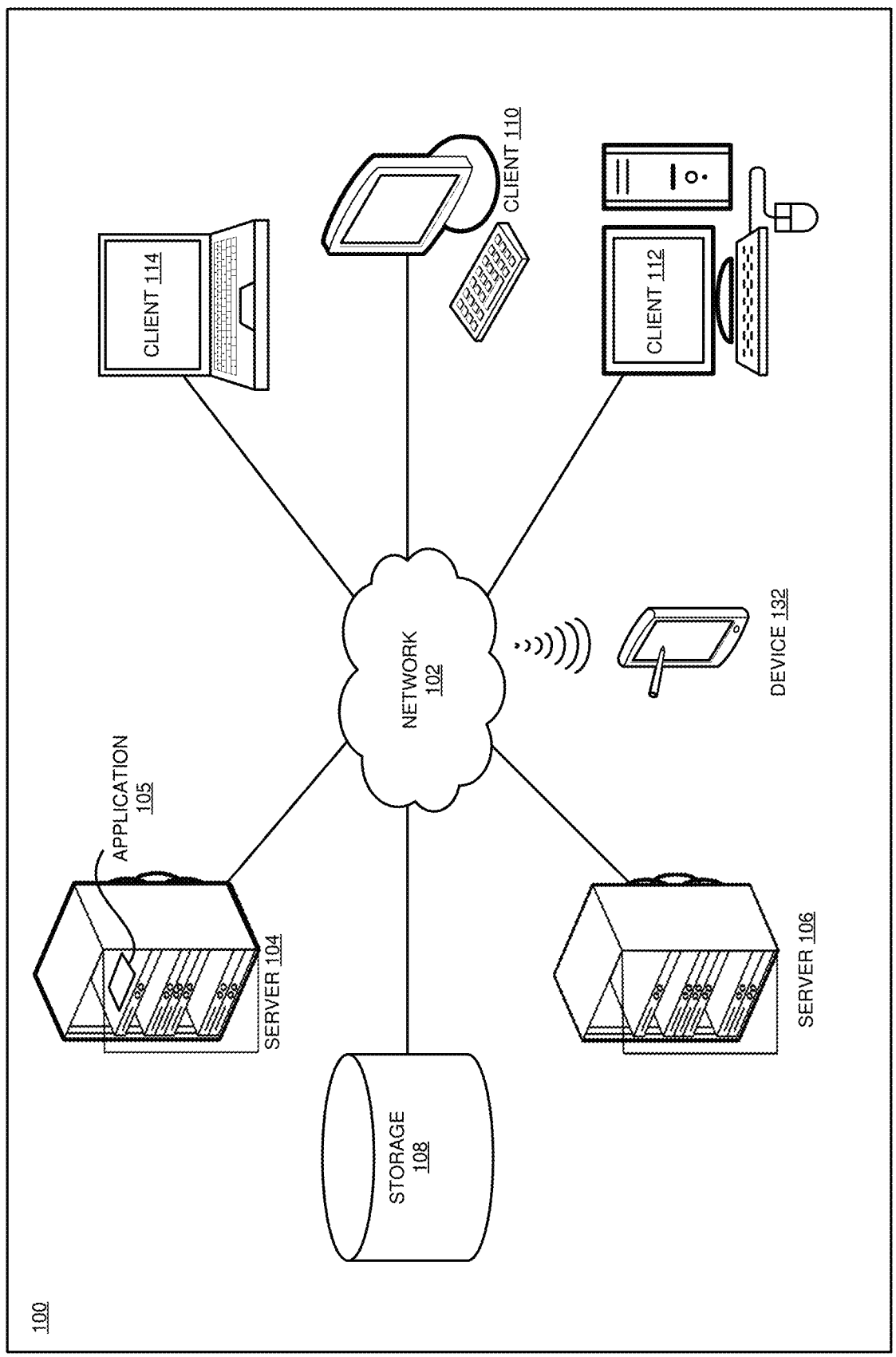
FIG. 1 depicts a block diagram of a network of data processing systems in which illustrative embodiments may be implemented.

The illustrative embodiments recognize that intensity images—for example, resulting from OCT, sonography, lidar, radar, or another imaging technique—are subject to speckle, i.e. random granular noise. Most surfaces being imaged using intensity imaging are not smooth at the scale of the wavelength being using for imaging. As a result, such surfaces do not reflect energy perfectly, but instead also scatter energy in other directions. The scattered signals add constructively and destructively depending on the relative phrases of each scattered waveform. These patterns of constructive and destructive interference show up as bright and dark dots within the resulting intensity image.

Thus, speckle causes the grainy appearance of images such as those obtained from OCT and sonography, and is dependent on both the wavelength of the imaging beam and the structural characteristics of the subject of the imaging. Therefore, speckle contains both noise and information, and the two must be separated to improve image quality. Speckle noise degrades the image quality, masks image features, and makes it difficult to use the images to perform the task for which the images were captured.

For example, lack of clarity at the edges of a particular structure being imaged can make it difficult to perform a reliable size measurement of that structure, or to diagnose a medical problem with that structure. In addition, in using OCT for retinal imaging, opacities within the eye, the edge of the pupil, and a dry cornea can affect image quality. Older patients, those most likely to need retinal imaging, are also those most likely to have these existing problems within their eyes.

The illustrative embodiments recognize that current methods attempt to reduce speckle noise by using multiple intensity images to create one composite image. One prior art implementation collects multiple images of the same subject and averages the images together to reduce speckle noise. Another prior art implementation refines the method by averaging multiple images together several times, until the signal to noise ratio of the averaged image reaches a threshold level (i.e. the noise has been sufficiently reduced). In another prior-art refinement, particularly poor quality images are manually evaluated and discarded, and only the better quality images are averaged together.

However, such methods require additional time while the need for additional images is evaluated and necessary additional images are obtained, manual intervention with associated subjectivity to evaluate and discard poor quality images, and the lack of a consistent relationship between the number of images needed and the quality of those images. As well, obtaining sufficient images of an acceptable starting quality level may be difficult. In addition, such manual intervention requires clinical or other specialized skill training. For example, as a result of this lack, in medical imaging healthy subjects may be over imaged, obtaining additional unneeded images of already-acceptable quality, while failing to obtain enough images to produce a result of acceptable quality in less healthy subjects.

Consequently, the illustrative embodiments recognized that what is needed in the art is a method that improves image quality in/with a single captured intensity image, without the need for additional images. In addition, the method should produce an image quality measurement after an image quality update to tie a need for additional imaging to the current quality level. Further, the method should not require manual intervention to discard poor quality images.

The illustrative embodiments recognize that the presently available tools or solutions do not address these needs or provide adequate solutions for these needs. The illustrative embodiments used to describe the invention generally address and solve the above-described problems and other problems related to neural network based enhancement of intensity images.

An embodiment can be implemented as a software application. The application implementing an embodiment can be configured as a modification of an existing intensity imaging system, as a separate application that operates in conjunction with an existing intensity imaging system, a standalone application, or some combination thereof. Particularly, some illustrative embodiments provide a method by which speckle noise within a single intensity image can be reduced.

An embodiment includes a neural network. The neural network includes a generator network. The generator network takes an intensity image as an input, and generates another intensity image as an output. In one embodiment, the generator network includes a number of identical residual blocks, connected in series. A residual block is a neural network configuration including one or more skip connections. A skip connection connects one layer of a neural network with another non-adjacent layer. In addition, the generator network has a skip connection of its own, adding together the input to the first block and the output of the last block in the series to produce a final output. Other generator network configurations are also possible and contemplated within the scope of the illustrative embodiments.

In an embodiment, each residual block includes one or more convolutional layers, connected in series. A convolutional layer applies a convolution operation to an input. Each convolutional layer is preceded by a pre-activation section. In addition, each residual block has a skip connection configured to add together the input to the first pre-activation section and the output of the last convolutional layer in the series, to produce a final output of the residual block. This skip connection helps information to flow through the network, and improves gradient flow during back-propagation.

In one embodiment, the pre-activation section includes a batch normalization unit and a rectified linear unit. A batch normalization unit transforms an input into a unit Gaussian distribution. A rectified linear unit sets a negative input to 0, and passes along a positive input unchanged. Together, the batch normalization and rectified linear units improve the network's training and generalization capabilities.

In one embodiment, each convolutional layer includes a 3×3 kernel and 64 filters. Other residual block configurations, including other pre-activation and convolutional layer configurations and dimensions, are also possible and contemplated within the scope of the illustrative embodiments.

An embodiment trains the generator network before processing individual captured images. To obtain training data, an embodiment uses one or more collections of intensity images. Each collection is of the same subject obtained during the same imaging session. Different collections may be images of different subjects collected using different imaging equipment. However, all of the collections are of the same image type, i.e. all OCT images or all lidar images. An embodiment registers all of the images to a common reference image. Registration, a prior-art process, adjusts an image to conform to the alignment and size of a reference image. Registering images to a common reference ensures that the same coordinates in each image depict the same areas of the imaging subject.

An embodiment uses, as training data, pairs of images from a collection of images. One member of the pair—considered the noisy image for training purposes—is a single intensity image of a subject. The other member of the pair—considered the clean image for training purposes—has less noise than the noisy image. In one embodiment, the clean image is acquired using a higher dose of radiation than was used for the noisy image. In another embodiment, the clean image is acquired with higher-quality equipment, producing less noise, than was used for the noisy image.

In another embodiment, the clean image is a composite intensity image of the same object, or the same type of object, as the noisy image. Here, the same type of object refers to objects having substantially similar structures. For example, two OCT images of the retinas of different subjects have a common type of object—retinas. However, an OCT image of a retina and an OCT image of a heart do not have a common type of object. To create the composite intensity image, an embodiment combines together multiple intensity images of the same object being imaged. The combining uses a statistical method, e.g., averaging, standard deviation, or a combination of these and/or other suitable methods. For example, combining together multiple intensity images of the same object being imaged produces an image having less speckle noise than any one of the original images, making the result suitable for training use as a clean image.

Using this training data, an embodiment trains the generator network to minimize a loss function, mean-squared error loss. As a result, once trained to minimize mean-squared error loss, the generator network improves the peak signal to noise ratio of an input image, reducing speckle noise in the input image and thus enhancing the input image. Unlike prior-art statistical methods for reducing speckle noise, training in this manner does not make assumptions as to the noise distribution or presence of artifacts in images to be enhanced. However, training only to minimize mean-squared error loss can produce images with overly-smoothed textures and blurriness at the edges of structures.

In some applications, such as OCT scans of retinas, edge details are important in diagnosis. Consequently, another embodiment includes a discriminator network in addition to a generator, and is trained using two additional loss function components, perceptual loss and adversarial loss.

In particular, during training one embodiment uses the generator network to enhance a noisy image of a training pair of images. The embodiment then compares the enhanced image to the clean image from the same training pair of images. In particular, to perform the comparison, an embodiment applies intermediate stages of both images to a neural network, such as the VGG19 network (developed by the Oxford Visual Geometry Group), that has been previously trained, using a prior-art method, to extract high-level features from images. The pre-trained neural network produces a feature map, a mathematical representation of the extracted high-level features, for each input image stage. Then the embodiment compares the two feature maps.

In particular, one embodiment computes a Euclidean distance between the two feature maps. In particular, the Euclidean distance can be computed as $$\frac{1}{W_{i,j}H_{i,j}}\sum_{x=1}^{W_{i,j}}\sum_{y=1}^{H_{i,j}}(\phi_{i,j}(I_{FA})_{x,y} - \phi_{i,j}(G_{\theta_G}(I_R))_{x,y})^2$$

where $I_{FA}$ denotes the clean image, $G_{\Theta G}(I_R)$ denotes the enhanced image, $\Phi_{i,j}$ denotes the feature map obtained by the $j^{th}$ convolution, after pre-activation, prior to the $i^{th}$ convolutional layer, and $W_{i,j}$ and $H_{i,j}$ describe the dimensions of the respective feature maps within the VGG network.

An embodiment uses the Euclidean distance as the perceptual loss function. Utilizing the perceptual loss function ensures that the network is trained to replicate image similarities more robustly than is the case when using only per-pixel mean-squared error loss.

An embodiment includes a discriminator network in addition to the generator network described herein. A discriminator network takes an image as an input, and classifies, or discriminates the image into two categories: real and artificially generated. The generator and discriminator networks are configured together, forming a generative adversarial network. Using a generative adversarial network keeps an image enhanced using the generator network from appearing too unrealistic.

In an embodiment, the discriminator network includes one or more convolutional layers, connected in series, followed by one or more dense layers, also connected in series. A dense layer is a fully-connected neural network layer. In one embodiment, the first two convolutional layers each include a 3×3 kernel and 64 filters. The next two convolutional layers each include a 3×3 kernel and 128 filters. The next two convolutional layers each include a 3×3 kernel and 256 filters. The next two convolutional layers each include a 3×3 kernel and 512 filters. Thereafter, the embodiment includes a 1028-unit dense layer and a 1-unit dense layer. Other discriminator network configurations, including other convolutional and dense layer configurations and dimensions, are also possible and contemplated within the scope of the illustrative embodiments.

An embodiment trains the generator and discriminator networks together, to minimize a third loss function, an adversarial loss function. Because the generator network generates an enhanced image from a noisy image and a discriminator network classifies an image as either real or artificially generated, training both networks together using an adversarial loss function seeks to minimize a difference between real and artificially generated images. In other words, using both networks helps keep artificially generated images looking realistic. In particular, during training, an embodiment holds the discriminator network in a fixed state while updating the generator network, then the embodiment holds the generator network in a fixed state while updating the discriminator network. Training proceeds in this alternating manner to minimize the maximum value of a distance measure between data distributions of the enhanced image (produced by the generator network from the noisy training image) and the clean training image. In one embodiment, the distance measure uses the Wasserstein distance, a distance function defined between probability distributions that represents a minimum cost of changing one probability distribution into the other. The distance measure also includes a gradient penalty, to improve efficiency during network training.

Thus, an embodiment trains a generative adversarial network, including a generator and a discriminator network, using an overall loss function. The overall loss function is a combination of the mean-squared error loss function, the perceptual loss function, and the adversarial loss function. In particular, in one embodiment the overall loss function can be computed as $$\min_{G} \max_{D} aL_a(D, G) + bL_p(G) + cL_{mse}(G),$$

where G and D denote the generator and discriminator networks respectively, $L_a(D,G)$ denotes the adversarial loss function, $L_p(G)$ denotes the perceptual loss function, $L_{mse}(G)$ denotes the mean squared error loss function, and a,b, and c are weighting parameters used to control the relative weighting of each component of the overall loss function.

Training proceeds until the generative adversarial network reaches predetermined training completion criteria. Training completion criteria can be when further training produces an output image meeting predetermined improvement criteria, when further training produces a change in network weights below a threshold level or a threshold percentage of change, when a predetermined number of training steps has been completed, or any other suitable criteria known to those of ordinary skill in the art.

Once an embodiment trains a generative adversarial network, the embodiment uses the network to enhance intensity images. In particular, an embodiment receives an intensity image.

To determine if the intensity image requires enhancement, an embodiment computes an image quality measurement for the image. Alternatively, an embodiment receives an image quality measurement for the image along with the image. The image quality measurement may be, for example, mean contrast to noise ratio, a signal strength index provided by some intensity imagery equipment, or any other suitable measurement or combination of measurements. An embodiment also includes a predetermined threshold for the selected image quality measurement. If the image quality measurement is above the threshold, the received image already has an acceptable level of quality and no enhancement is needed. Another embodiment omits this step, attempting to enhance a received image regardless of initial quality.

If an embodiment determines that an intensity image should be enhanced, the embodiment applies the intensity image to the input of the network. The generative adversarial network outputs both an image and a classification of the output image as either real or artificially generated. However, once the network has been trained, only the output image is used.

An embodiment computes an image quality measurement for the image output by the generative adversarial network. The image quality measurement may be the same or a different measurement or combination of measurements as was used on the input image. If the image quality measurement for the output image is above a predetermined, measurement-specific threshold, the output image is deemed to now have an acceptable quality. If so, the embodiment stores the now-enhanced image for later use.

The manner of neural network based enhancement of non-photographic intensity images described herein is unavailable in the presently available methods in the technological field of endeavor pertaining to digital image enhancement. A method of an embodiment described herein, when implemented to execute on a device or data processing system, comprises substantial advancement of the functionality of that device or data processing system in using a trained generative adversarial network to enhance an intensity image.

The illustrative embodiments are described with respect to certain types of measurements, image quality measurements, residual blocks, convolutional layers, dense layers, generator networks, discriminator networks, generative adversarial networks, thresholds, adjustments, enhancements, intensity sensors, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
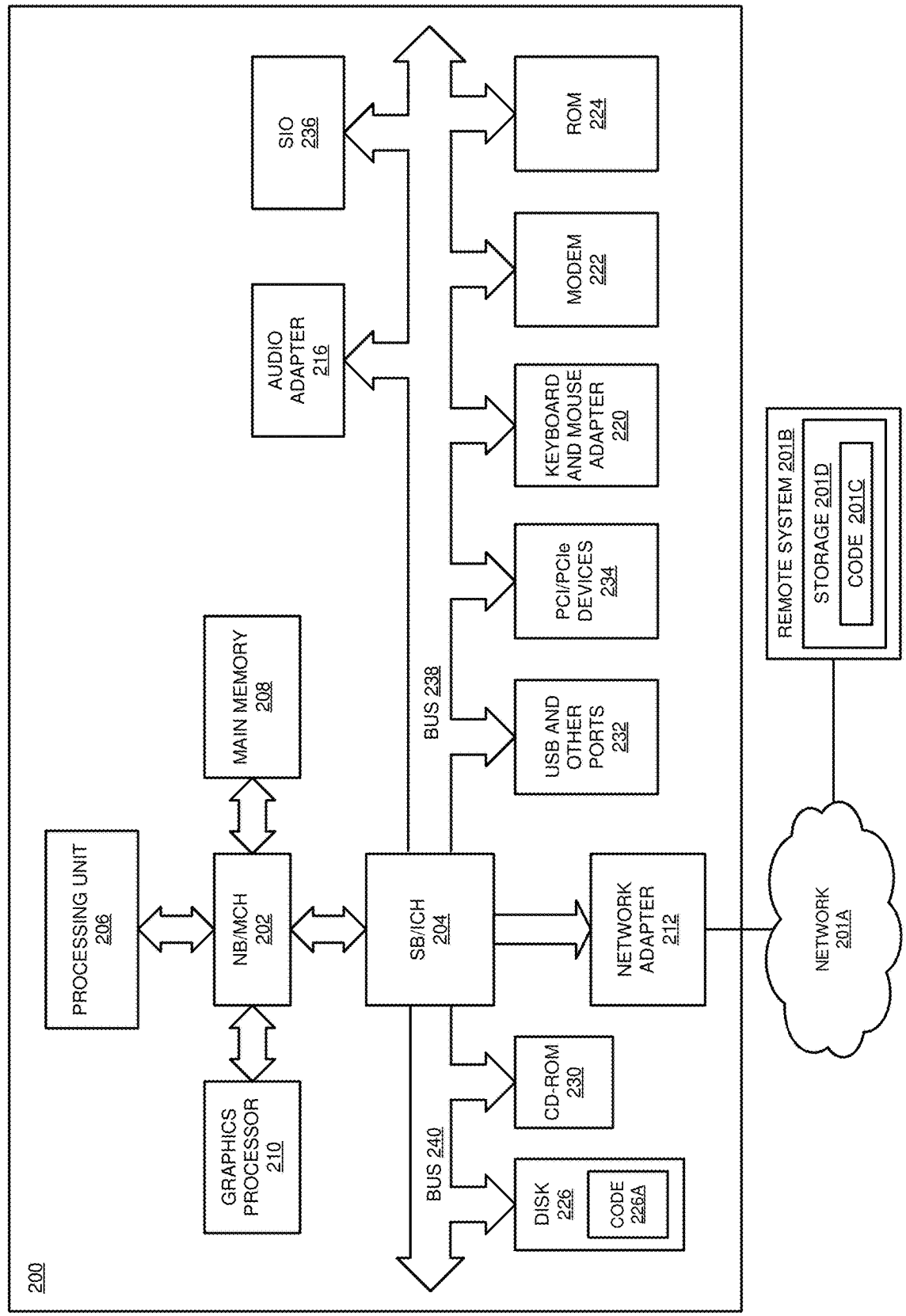
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, and 114, and device 132. Application 105 receives image data from any suitable source, and stores the image data, for example in storage unit 108.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
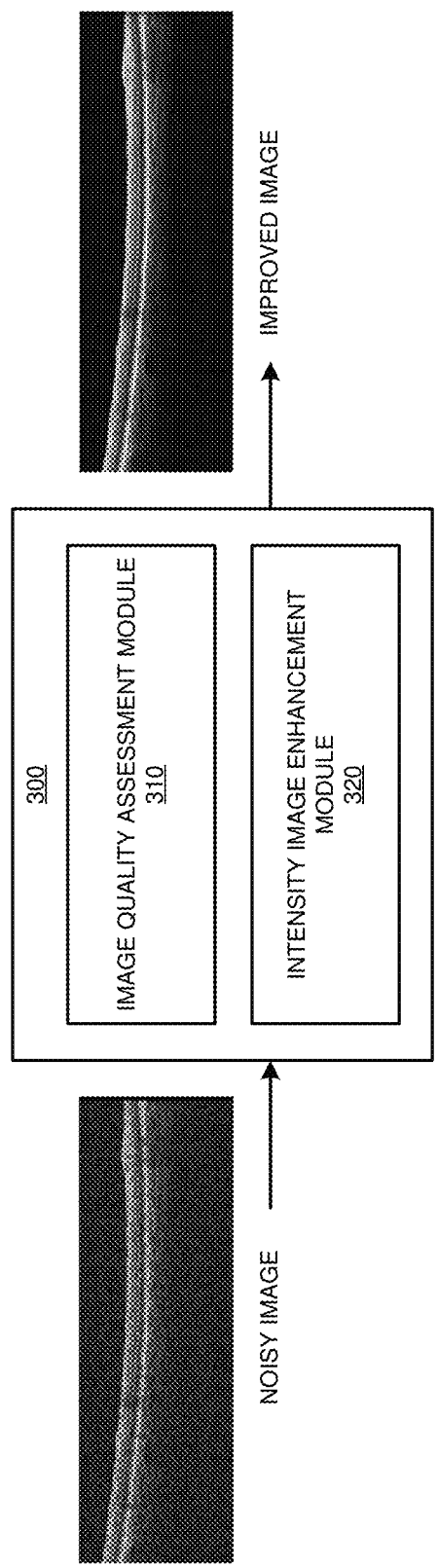
FIG. 3 depicts a block diagram of an example configuration for neural network based enhancement of intensity images in accordance with an illustrative embodiment.

With reference to FIG. 3, this figure depicts a block diagram of an example configuration for neural network based enhancement of intensity images in accordance with an illustrative embodiment. Application 300 is an example of application 105 in FIG. 1 and executes in any of servers 104 and 106, clients 110, 112, and 114, and device 132 in FIG. 1.

Image quality assessment module 310 computes an image quality measurement for an intensity image.

Module 310 can also use a received image quality measurement for an image. The image quality measurement may be, for example, mean contrast to noise ratio, a signal strength index provided by some intensity imagery equipment, or any other suitable measurement or combination of measurements. Module 310 also includes a predetermined threshold for the selected image quality measurement.

Application 300 trains and then uses intensity image enhancement module 320 to improve intensity image quality, as measured by module 310.

Figure 4:
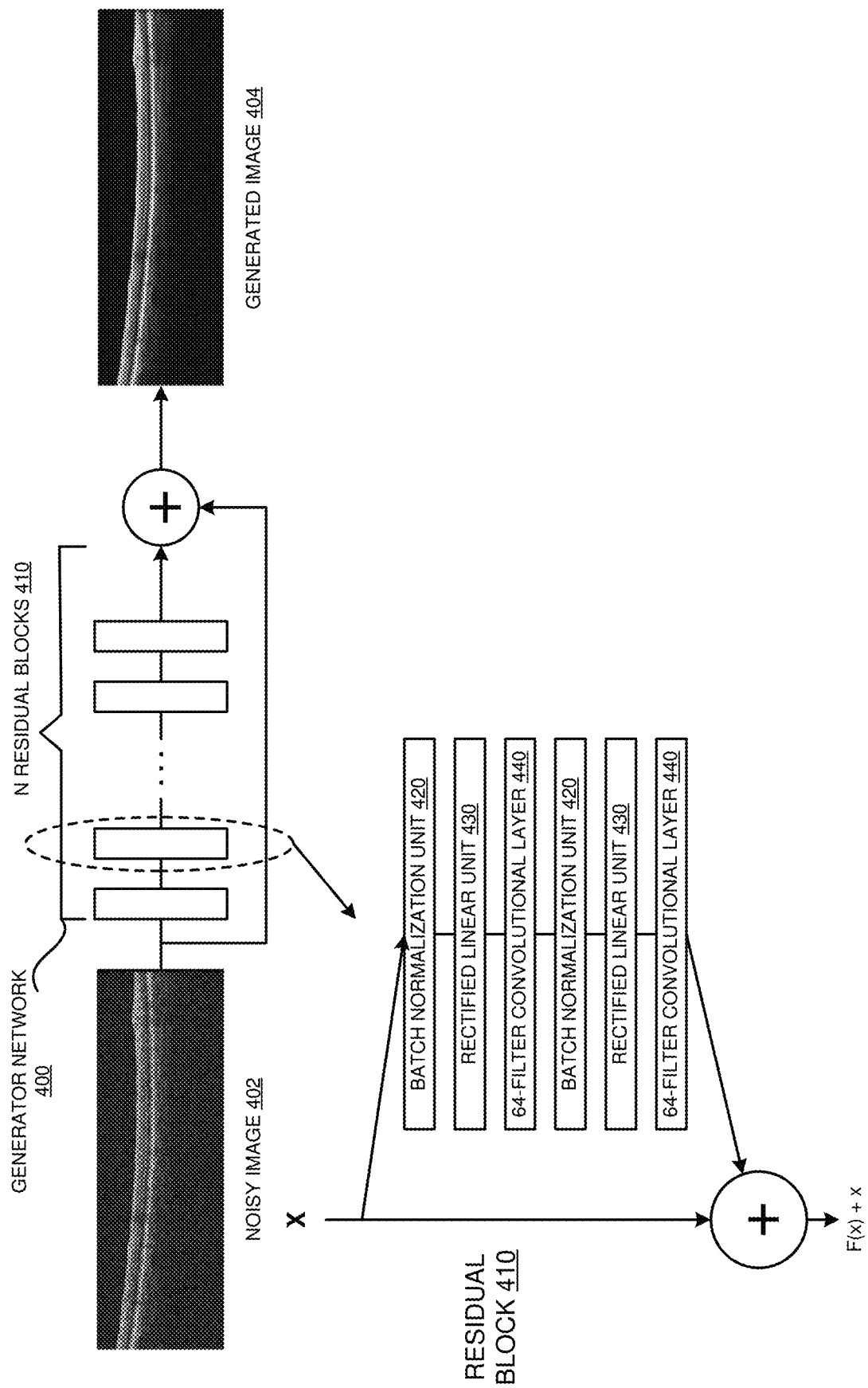
FIG. 4 depicts more detail of an example configuration for neural network based enhancement of intensity images in accordance with an illustrative embodiment.

With reference to FIG. 4, this figure depicts more detail of an example configuration for neural network based enhancement of intensity images in accordance with an illustrative embodiment. In particular, FIG. 4 depicts a generator network portion of module 320 in FIG. 3.

Generator network 400 takes as an input noisy image 402 and produces generated image 404. Once network 400 has been trained, generated image 404 has an improved image quality, as measured by an image quality measurement, compared to noisy image 402.

Generator network 400 includes N identical residual blocks 410, connected in series. N can be any whole number greater than 1. Network 400 also has a skip connection, adding together the input to the first block 410 and the output of the last block 410 in the series to produce a final output.

Each residual block 410 includes one or more convolutional layers, connected in series. Each convolutional layer is preceded by a pre-activation section. In addition, each residual block has a skip connection configured to add together the input to the first pre-activation section and the output of the last convolutional layer in the series, to produce a final output of the residual block.

In particular, FIG. 4 depicts a residual block 410 having two 64-filter convolutional layers 440, each including a 3×3 kernel. Each layer 440 is preceded by a pre-activation section. The pre-activation section includes batch normalization unit 420 and rectified linear unit 430.

Figure 5:
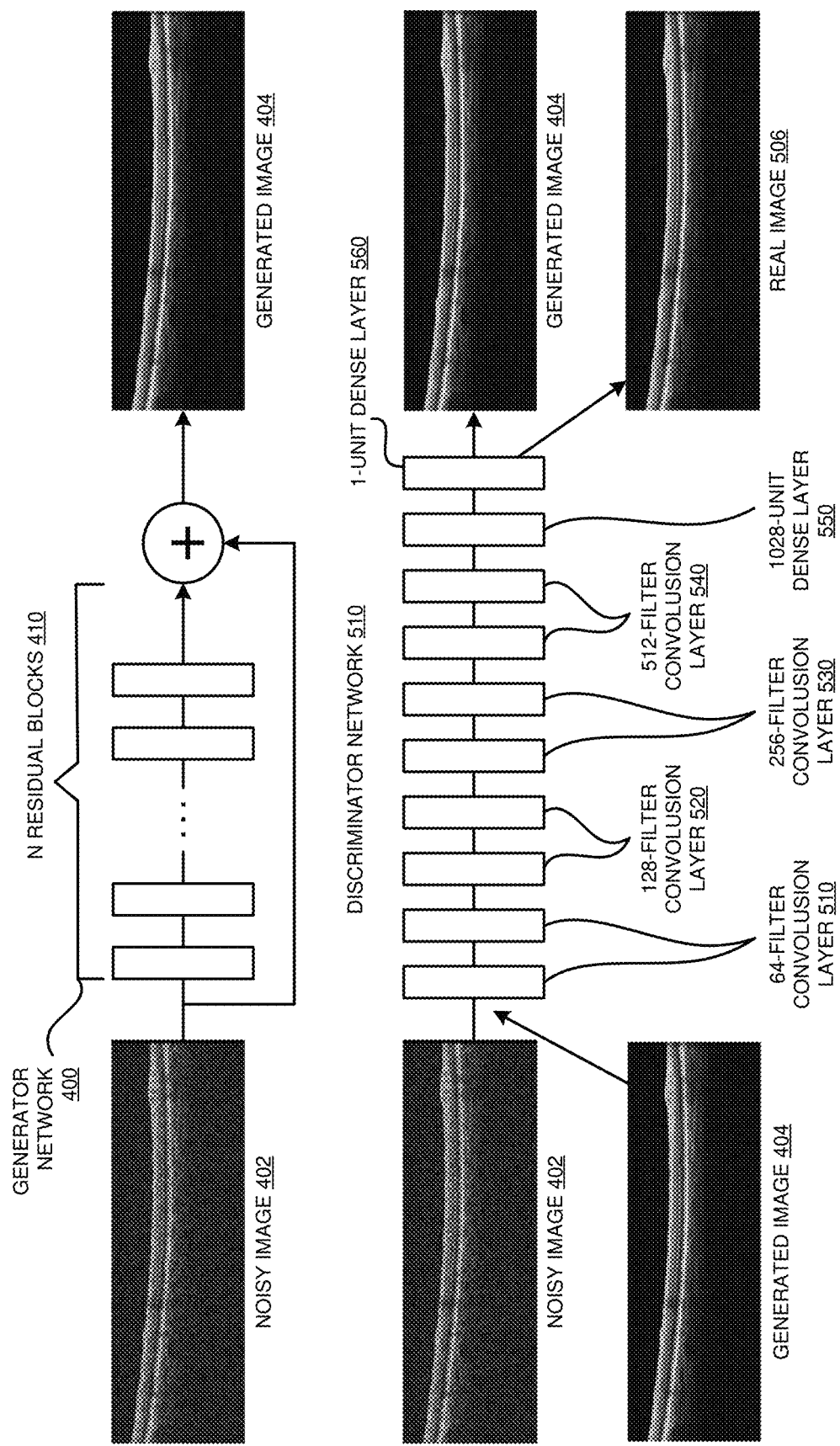
FIG. 5 depicts more detail of an example training configuration for neural network based enhancement of intensity images in accordance with an illustrative embodiment.

With reference to FIG. 5, this figure depicts more detail of an example training configuration for neural network based enhancement of intensity images in accordance with an illustrative embodiment. In particular, FIG. 5 depicts both a generator network portion and a discriminator network portion of module 320 in FIG. 3. Generator network 400, noisy image 402, generated image 404, and N identical residual blocks 410 are the same as generator network 400, noisy image 402, generated image 404, and N identical residual blocks 410 in FIG. 4.

Discriminator network 510 takes as an input an intensity image, such as noisy image 402 or generated image 404, and classifies, or discriminates the image into two categories: real (for example, real image 506) and artificially generated (for example, generated image 404.

Discriminator network 510 includes one or more convolutional layers, connected in series, followed by one or more dense layers, also connected in series. In particular, as illustrated, network 510 includes two 64-filter convolutional layers 510, two 128-filter convolutional layers 520, two 256-filter convolutional layers 530, and two 512-filter convolutional layers 540, each including a 3×3 kernel. Network 510 also includes 1028-unit dense layer 550 and 1-unit dense layer 560.

Figure 6:
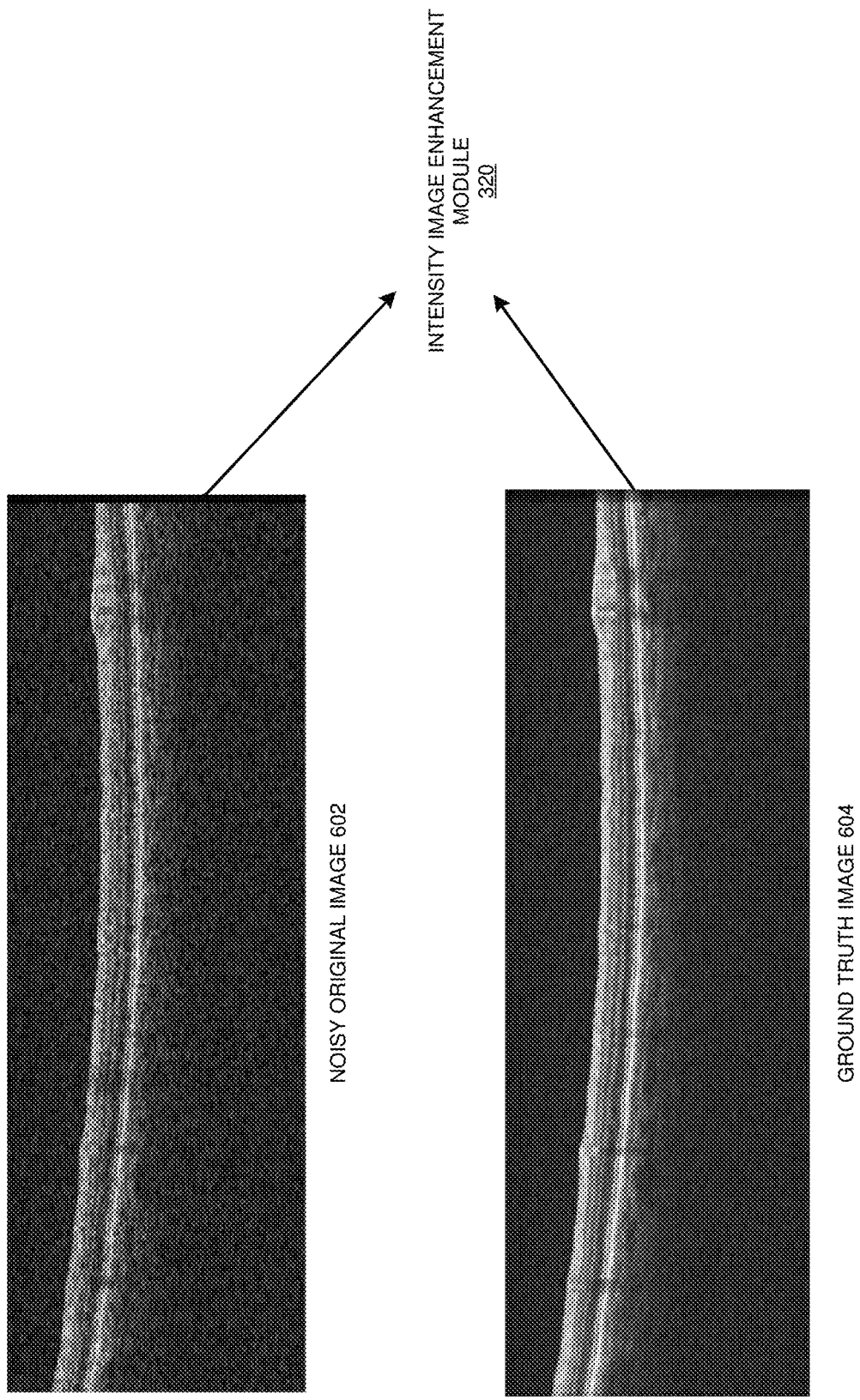
FIG. 6 depicts an example configuration for training a generative adversarial network to perform neural network based enhancement of intensity images in accordance with an illustrative embodiment.

With reference to FIG. 6, this figure depicts an example configuration for training a generative adversarial network to perform neural network based enhancement of intensity images in accordance with an illustrative embodiment. Training can be performed by application 300 in FIG. 3. Intensity image enhancement module 320 is the same as intensity image enhancement module 320 in FIG. 3.

Application 300 uses, as training data, pairs of images from a collection of registered images. One member of the pair—for training purposes, the noisy image—is a single intensity image of a subject—for example, noisy original image 602. The other member of the pair—for training purposes, the clean image—is, in this example, an composite intensity image of the same subject—for example, ground truth image 604. To create ground truth image 604, application 300 combines together multiple intensity images of the same subject. For example, multiple intensity images of the same subject are combined together using averaging to create ground truth image 604. Averaging together multiple intensity images of the same subject produces an image having less speckle noise than any one of the original images, making the result suitable for training use as a clean image. Using this training data, application 300 trains intensity image enhancement module 320 to minimize a loss function.

Figure 7:
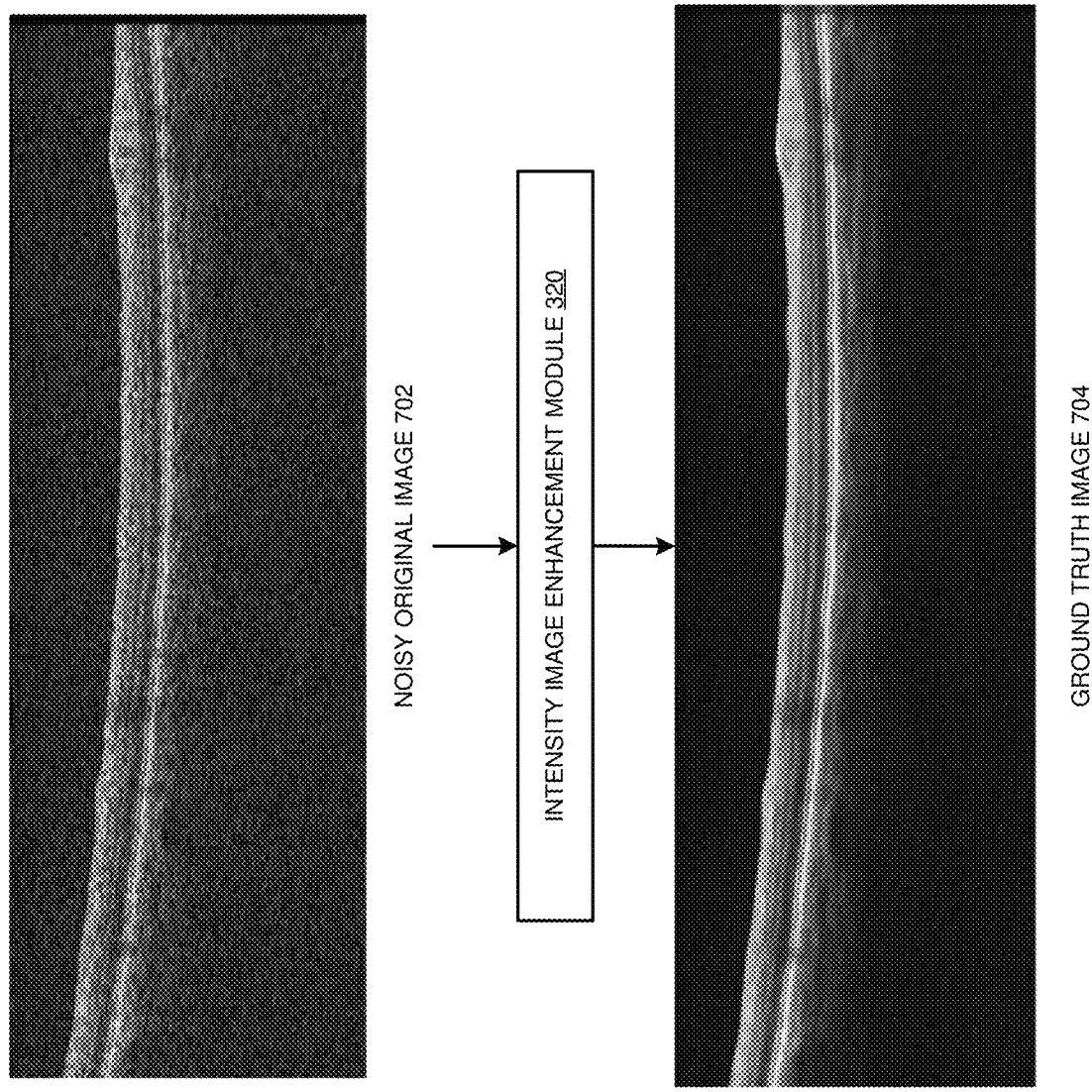
FIG. 7 depicts an example of neural network based enhancement of intensity images in accordance with an illustrative embodiment.

With reference to FIG. 7, this figure depicts an example of neural network based enhancement of intensity images in accordance with an illustrative embodiment. Intensity image enhancement module 320 is the same as intensity image enhancement module 320 in FIG. 3.

In FIG. 7, noisy original image 702 is applied to the input of generative adversarial network 320. Network 320 has previously been trained only to minimize mean-squared error loss. As a result, network 320 improves the peak signal to noise ratio of noisy original image 702, producing enhanced image 704. As shown, enhanced image 704 has reduced speckle noise and smoother textures as compared to noisy original image 702.

Figure 8:
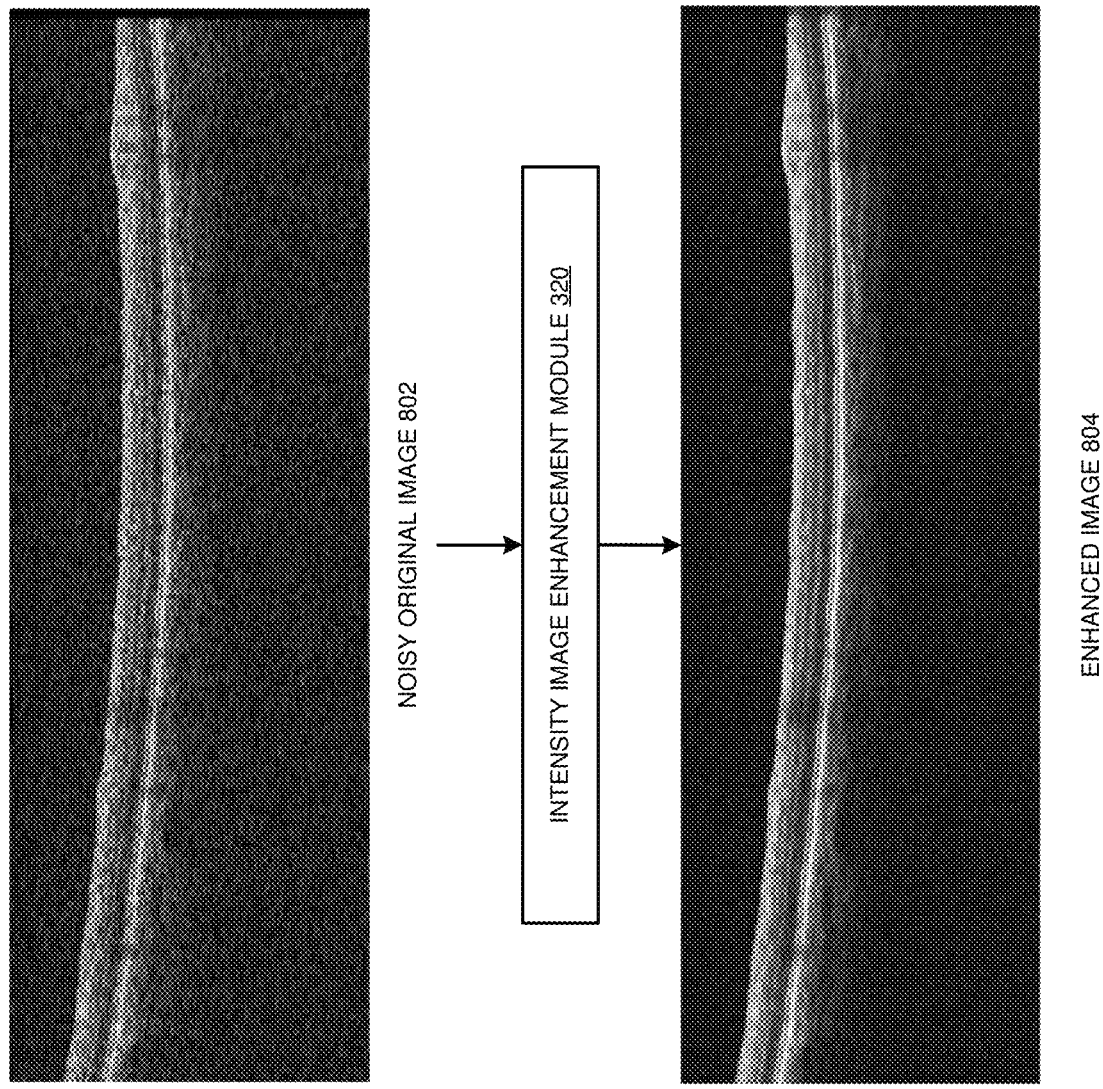
FIG. 8 depicts an example of neural network based enhancement of intensity images in accordance with an illustrative embodiment.

With reference to FIG. 8, this figure depicts an example of neural network based enhancement of intensity images in accordance with an illustrative embodiment. Intensity image enhancement module 320 is the same as intensity image enhancement module 320 in FIG. 3.

In FIG. 8, noisy original image 802 is applied to the input of generative adversarial network 320. Network 320 has previously been trained using an overall loss function. The overall loss function is a combination of the mean-squared error loss function, the perceptual loss function, and the adversarial loss function. As a result, network 320 improves the quality of noisy original image 802 (as measured by an image quality measurement in a manner described herein), producing enhanced image 804. As shown, enhanced image 804 has reduced speckle noise as compared to noisy original image 802, but also appears more realistic than enhanced image 704 in FIG. 7.

Figure 9:
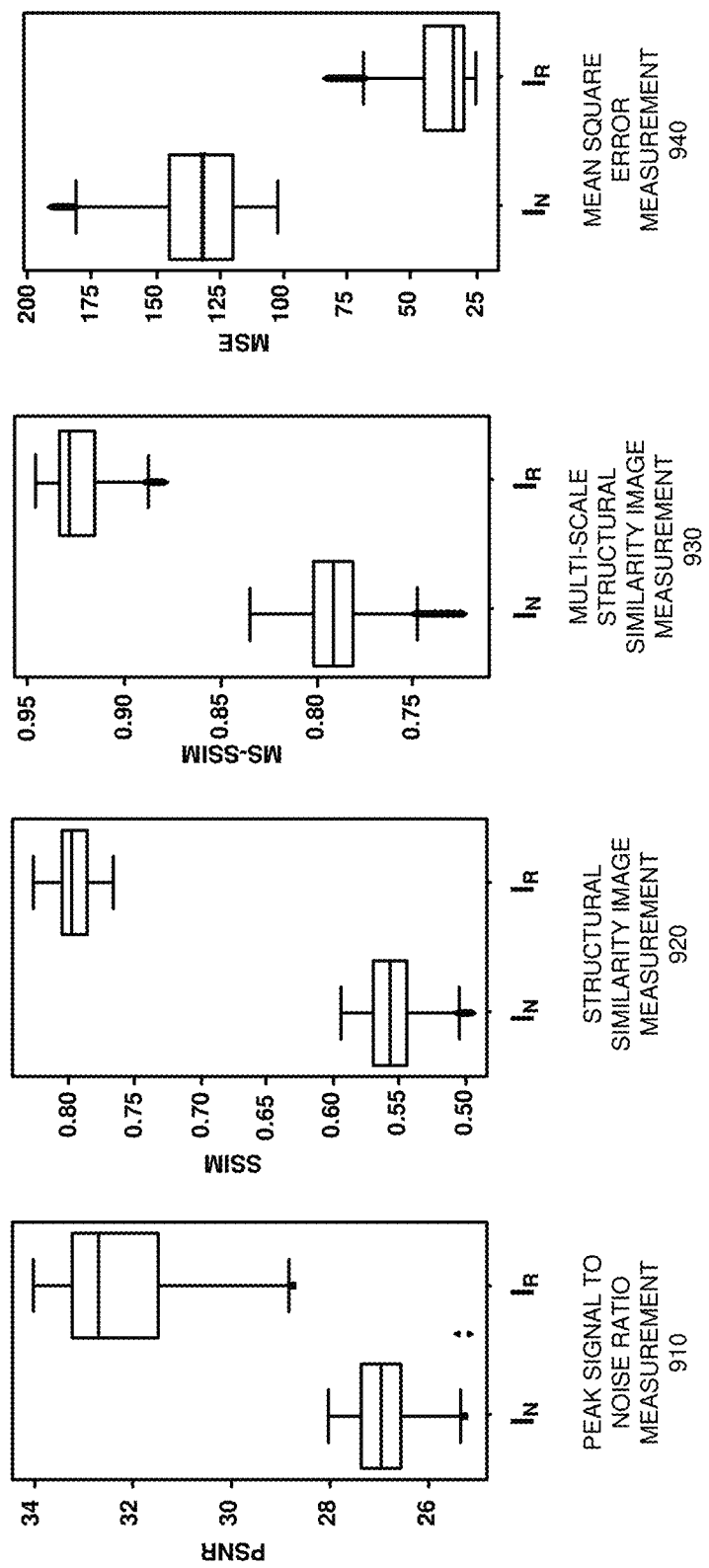
FIG. 9 depicts results of an example of neural network based enhancement of intensity images in accordance with an illustrative embodiment.

With reference to FIG. 9, this figure depicts results of an example of neural network based enhancement of intensity images in accordance with an illustrative embodiment. In particular, FIG. 9 depicts four example image quality measurement improvements corresponding to the difference between noisy original image 802 and enhanced image 804 in FIG. 8.

In FIG. 9, $I_N$ and $I_R$ denote image quality measurements for noisy original image 802 and enhanced image 804 respectively. For peak signal to noise ratio measurement 910, structural similarity image measurement 920, and multi-scale structural similarity image measurement 930, a higher number in the vertical axis denotes an improvement in a respective image quality measurement. For mean square error measurement 940, a higher number in the vertical axis denotes an improvement in the image quality measurement.

Figure 10:
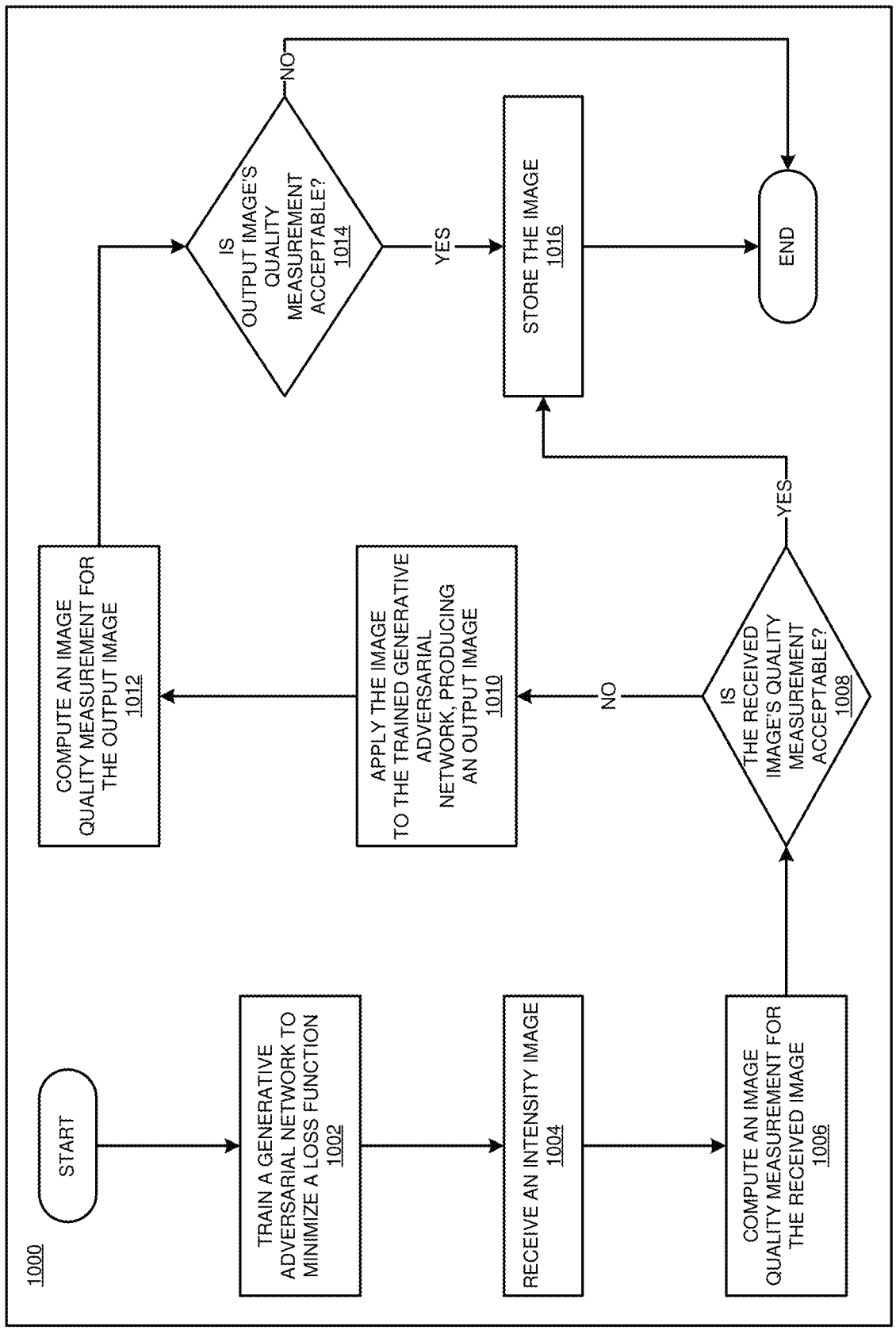
FIG. 10 depicts a flowchart of an example process for neural network based enhancement of intensity images in accordance with an illustrative embodiment.

With reference to FIG. 10, this figure depicts a flowchart of an example process for neural network based enhancement of intensity images in accordance with an illustrative embodiment. Process 1000 can be implemented in application 300 in FIG. 3.

In block 1002, the application trains a generative adversarial network to minimize a loss function. In block 1004, the application receives an intensity image. In block 1006, the application computes an image quality measurement for the received image. In block 1008, the application checks whether the image quality measurement for the received image is acceptable (i.e. above or below a predetermined threshold, as appropriate to the measurement). If yes ("YES" path of block 1008), in block 1016 the application stores the image, then ends. If not ("NO" path of block 1008), in block 1010 the application applies the image to the trained generative adversarial network, producing an output image. In block 1012, the application computes an image quality measurement for the output image. In block 1014, the application checks whether the image quality measurement for the output image is acceptable (i.e. above or below a predetermined threshold, as appropriate to the measurement). If yes ("YES" path of block 1014), in block 1016 the application stores the image, then ends. If not ("NO" path of block 1014), the application skips storing the image and ends.

Thus, a computer implemented method, system or apparatus, and computer program product are provided in the illustrative embodiments for neural network based enhancement of intensity images and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
constructing a generative adversarial network (network) comprising a generator portion and a discriminator portion;
configuring the network such that the network operates to enhance intensity images, wherein an intensity image is obtained by illuminating an object with an energy pulse and measuring a return strength of the energy pulse, and wherein a pixel of the intensity image corresponds to the return strength;
minimizing, as a part of the configuring, a loss function of the generative adversarial network, the loss function comprising a mean square error loss measurement of a noisy intensity image relative to a mean square error loss measurement of a corresponding clean intensity image; and
generating an enhanced intensity image by applying the minimized loss function of the network to an original intensity image, the applying improving an image quality measurement of the enhanced intensity image relative to the original intensity image.

2. The method of claim 1, wherein the loss function further comprises a perceptual loss measurement of the noisy intensity image relative to a perceptual loss measurement of the clean intensity image.

3. The method of claim 1, wherein the loss function further comprises an adversarial loss measurement, the adversarial loss measurement resulting from applying a generated intensity image to the discriminator portion, the generated intensity image produced by applying the noisy intensity image to the generator portion.

4. The method of claim 1, wherein the clean intensity image comprises a composite intensity image created by combining a set of intensity images, the set of intensity images and the noisy image being of the same imaged object.

5. The method of claim 1, wherein the generator portion comprises a set of residual blocks.

6. The method of claim 5, wherein a residual block within the set of residual blocks comprises a pre-activation section followed by a convolutional layer, the pre-activation section comprising a batch normalization unit and a rectified linear unit.

7. The method of claim 6, wherein the convolutional layer comprises a 64-filter convolutional layer having a 3×3 kernel.

8. The method of claim 1, wherein the discriminator portion comprises a convolutional layer and a dense layer.

9. The method of claim 8, wherein the convolutional layer comprises a 64-filter convolutional layer, a 128-filter convolutional layer, a 256-filter convolutional layer, and a 512-filter convolutional layer, each layer having a 3×3 kernel.

10. The method of claim 8, wherein the dense layer comprises a 1028-unit dense layer and a 1-unit dense layer.

11. A computer usable program product comprising a computer readable storage medium, and program instructions stored on the computer readable storage medium, the stored program instructions comprising:
program instructions to construct a generative adversarial network (network) comprising a generator portion and a discriminator portion;
program instructions to configure the network such that the network operates to enhance intensity images, wherein an intensity image is obtained by illuminating an object with an energy pulse and measuring a return strength of the energy pulse, and wherein a pixel of the intensity image corresponds to the return strength;
program instructions to minimize, as a part of the configuring, a loss function of the generative adversarial network, the loss function comprising a mean square error loss measurement of a noisy intensity image relative to a mean square error loss measurement of a corresponding clean intensity image; and
program instructions to generate an enhanced intensity image by applying the minimized loss function of the network to an original intensity image, the applying improving an image quality measurement of the enhanced intensity image relative to the original intensity image.

12. The computer usable program product of claim 11, wherein the loss function further comprises a perceptual loss measurement of the noisy intensity image relative to a perceptual loss measurement of the clean intensity image.

13. The computer usable program product of claim 11, wherein the loss function further comprises an adversarial loss measurement, the adversarial loss measurement resulting from applying a generated intensity image to the discriminator portion, the generated intensity image produced by applying the noisy intensity image to the generator portion.

14. The computer usable program product of claim 11, wherein the clean intensity image comprises a composite intensity image created by combining a set of intensity images, the set of intensity images and the noisy image being of the same imaged object.

15. The computer usable program product of claim 11, wherein the generator portion comprises a set of residual blocks.

16. The computer usable program product of claim 15, wherein a residual block within the set of residual blocks comprises a pre-activation section followed by a convolutional layer, the pre-activation section comprising a batch normalization unit and a rectified linear unit.

17. The computer usable program product of claim 16, wherein the convolutional layer comprises a 64-filter convolutional layer having a 3×3 kernel.

18. The computer usable program product of claim 11, wherein the stored program instructions have been transferred over a network from a remote data processing system.

19. The computer usable program product of claim 11, wherein the stored program instructions are downloaded over a network to a remote data processing system.

20. A computer system comprising a processor, a computer readable memory, and a computer readable storage medium, and program instructions stored on the computer readable storage medium for execution by the processor via the computer readable memory, the stored program instructions comprising:
program instructions to construct a generative adversarial network (network) comprising a generator portion and a discriminator portion;
program instructions to configure the network such that the network operates to enhance intensity images, wherein an intensity image is obtained by illuminating an object with an energy pulse and measuring a return strength of the energy pulse, and wherein a pixel of the intensity image corresponds to the return strength;
program instructions to minimize, as a part of the configuring, a loss function of the generative adversarial network, the loss function comprising a mean square error loss measurement of a noisy intensity image relative to a mean square error loss measurement of a corresponding clean intensity image; and
program instructions to generate an enhanced intensity image by applying the minimized loss function of the network to an original intensity image, the applying improving an image quality measurement of the enhanced intensity image relative to the original intensity image.

* * * * *